United States Patent [19]

Barber

[11] 3,761,743

[45] Sept. 25, 1973

[54] MONOSTABLE CIRCUIT

[75] Inventor: Joseph J. Barber, Williamsville, N.Y.

[73] Assignee: Houdaille Industries, Inc., Buffalo, N.Y.

[22] Filed: Sept. 30, 1971

[21] Appl. No.: 185,076

Related U.S. Application Data

[62] Division of Ser. No. 839,971, July 8, 1969, Pat. No. 3,622,763.

[52] U.S. Cl. .................................. 307/273, 328/207

[51] Int. Cl. .................................................. H03k 3/26

[58] Field of Search ........................ 307/273; 328/207

[56] References Cited

UNITED STATES PATENTS 3,480,801 11/1969 Smith ............................ 307/273 X 3,532,993 10/1970 Kennedy ........................ 307/273 X

OTHER PUBLICATIONS

"Electronic Design" by A. C. Ward, pages 45–46, dated Apr. 26, 1965.

*Primary Examiner*—Stanley D. Miller, Jr.
*Attorney*—Hill, Sherman, Meroni, Gross & Simpson

[57] ABSTRACT

A noise immune monostable circuit generating delayed pulses for digital control circuits such as found in numerical control systems. The timing cycle is initiated in response to a first logic level and interrupted if the input signal shifts to a second logic level. A bistable circuit is reset by the output from the timing circuit and serves to restore the timing circuit to initial condtion, terminating the output pulse from the timing circuit.

1 Claim, 2 Drawing Figures

MONOSTABLE CIRCUIT

CROSS-REFERENCE TO RELATED APPLICATION

The present application is a division of my application Ser. No. 839,971 filed July 8, 1969, now U.S. Pat. No. 3,622,763 issued Nov. 23, 1971.

SUMMARY OF THE INVENTION

This invention relates to a monostable circuit for digital control circuits such as found in numerical control systems and the like.

A feature of the invention resides in the provision of a novel monostable circuit for eliminating noise problems in digital circuitry such as found in numerical control systems.

IDENTIFICATION OF U.S. PATENT INCORPORATED BY REFERENCE

The drawings (FIGS. 1–6) and description of my parent application as found in my U.S. Pat. No. 3,622,763 issued Nov. 23, 1971 are incorporated herein by reference, attention being called particularly to the monostable circuits shown in FIGS. 2, 4 and 6 and the related description at column 4, lines 7–70, column 8, lines 21–25, column 9, lines 40–45, and column 12, lines 50–75.

DETAILED DESCRIPTION OF FIGS. 1 AND 2

Figures 1, 2:
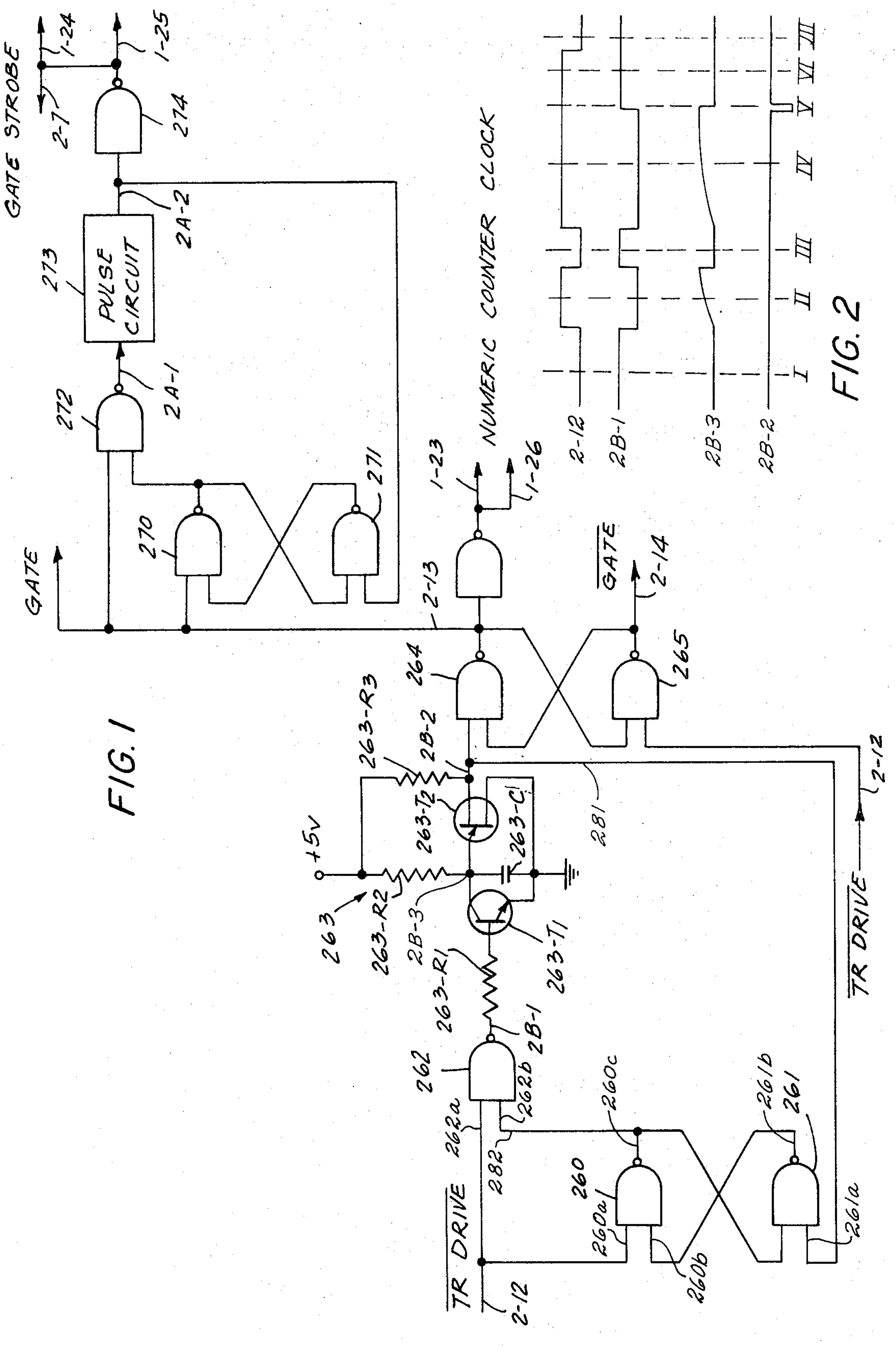
FIG. 1 is an enlarged view of the lower right hand portion of the second figure as incorporated herein by reference but substituting the circuit of FIG. 2A of U.S. Pat. No. 3,622,763 for the rectangle labeled "pulse circuit" at the center of such second figure to facilitate an understanding of the operation of this portion of such second figure and as an example of the monostable circuit in accordance with the present invention.
FIG. 2 is a waveform diagram showing the waveforms at selected points in the circuitry of FIG. 1, in a timed relationship.

By way of example, FIG. 1 shows a portion of the circuit of the second figure of U.S. Pat. No. 3,622,763 which responds to a signal $\overline{\text{TR DRIVE}}$ at conductor 2-12 leading to a first monostable circuit 260–263 in accordance with the present invention, and supplies signals as indicated by the labels on the output conductors for controlling the supply of data from the tape reader.

The tape reader is such that it will step one character for each pulse input it recieves. Each time the tape reader is advanced one character, the one-shot 260–265 at the bottom center of FIG. 2 generates a gate pulse output at 2-13. This pulse is delayed relative to the tape reader drive signal at 1-22 enough to insure that the tape reader is on character by the time this pulse appears. Thus, the flip flop formed by 264 and 265 will drive 2-13 high after the tape reader is on character. The gate signal at 2-13 is turned off when the next tape reader drive pulse is generated at 2-12. The gate causes the one-shot 270–274 at the right in FIG. 1 to generate a strobe signal at 1-24 and 1-25. This signal is a pulse occurring in the middle of the gate signal. This signal is used to strobe data into the control. The tape reader channels coming out of the tape reader are gated with the gate signal and distributed throughout the control for example as indicated at 1-31 to 1-34 and at 1-37.

Referring to FIG. 2, labels have been applied at the left to the respective waveforms to indicate the locations in the circuit of FIG. 1 at which the respective waveforms would be observed. Thus, the first waveform represents the potential level at input conductor 2-12 to the monostable circuit 260–263; the second waveform represents the potential at conductor 2B-1; the third waveform shows the potential variation at point 2B-3 of the timing circuit 263; and the last waveform shows the potential at the output 2B-2 of the monostable circuit 260–263. Various common points in time of the respective waveforms have been indicated by vertical-lines labeled I through VII. At time I, the input conductor 2-12 is shown as being at a relatively low potential. As described at column 3 of the incorporated patent, lines 13–19, a logical zero is defined as being zero volts and is called "low," while a logical one is defined as being 5 volts and is called "high." With conductor 2-12 low, input **260*a* of gate 260 is low, and output 260*c* is high. Thus, a first input 262 *a* of gate 262 is low, while a second input 262*b* is high, producing a high logic level at output 2B-1 at time I as indicated by the second waveform of FIG. 2. Since 2B-1 is high, transitor 263-T1 is on and circuit point 2B-3 will be at a relatively low potential as indicated at time I for the third waveform of FIG. 2. With a low input to transistor 263-T2, this transitor will be off, so that the potential at output 2B-2** will be high as represented by the last waveform of FIG. 2 at time I.

As explained at column 4 of the referenced patent, lines 64–68, the monostable circuit has certain advantages, one of them being that it is extremely noise-immune. The circuit has been tested with noise spikes of over 7 volts appearing on the ground line and it has not misfired. Thus, if at time II in FIG. 2, input conductor 2-12 should be momentarily driven to a high potential condition, point 2B-1 will be driven to a low potential condition, turning off transitor 263-T1. Thus, capacitor 263-C will begin charging and the potential at circuit point 2B-3 will begin rising as indicated in the third waveform of FIG. 2 at time II. However, if the potential change at input 2-12 is merely momentary as indicated in the first waveform of FIG. 2, so that the potential level at 2-12 returns to the low level at time III, output 2B-1 of gate 262 will immediately return to the high potential condition as indicated by the second waveform at time III, the transitor 263-T1 will be turned on, and capacitor 263-C will be discharged through the collector-emitter path of transistor 263-T1. Thus, at time III in FIG. 2, the third waveform shows that the potential at circuit point 2B-3 has returned to the initial low level, and the momentary pulse at time II had no persistent effect on the timing circuit 263.

If, however, as represented at time IV in FIG. 2, input conductor 2-12 remains at the high potential condition, transistor 263-T1 will remain off, and circuit 263 will complete a timing cycle, reaching a potential at circuit point 2B-3 sufficient to turn on transistor 263-T2. With transistor 263-T2 on, output 2B-2 is at a low potential condition as indicated at time V in FIG. 2. The low potential condition at 2B-2 is transmitted via conductor 281 to an input **261*a* of gate 261, driving output 261*b* high. Thus the inputs 260*a* and 260*b* of gate 260 are both high, driving output 260*c* low and driving the second input 262*b* of gate 262 low. With 262*b*** low, conductor 2B-1 will be at a high potential condition, and transistor 263-T1 will be turned on to discharge capacitor 263-C. As soon as capacitor 263-C reaches a relatively lower potential, transistor 263-T2 will be turned off, and output 2B-2 will return to a high potential condition as represented at time VI in FIG. 2. At the beginning of a further $\overline{\text{TR DRIVE}}$ signal, input conductor 2-12 is at a low potential condition as indicated at time VII in FIG. 2, and the circuit is ready to begin a new timing cycle.

As described at column 4 of the referenced patent, lines 60–62, the input to the monostable circuit must stay high long enough for the circuitry to time out. Otherwise, no output pulse appears as is apparent from the last waveform of FIG. 2 at the end of time II.

Gate 262 is thus a logic gate having its output connected to the control input of the timing circuit 263 for supplying a logical control signal thereto as represented by the second waveform of FIG. 2. The gate 262 has a first logic gate input 262*a* connected with the input conductor 2-12 and has a second logic gate input 262*b* connected with the reset circuit 260–261. The circuit 260–261 is connected with the output 2B-2 of the timing circuit 263 by means of conductor 281 and is connected with the second logic gate input 262*b* by means of a conductor 282. The circuit 260–261 is responsive to the output signal from the timing circuit at the time V in FIG. 2 to establish a high logic level at 2B-1 for restoring the timing circuit 263 to its initial condition. The circuit 260–261 after being reset by the output signal is responsive to a shifting of the input signal at 2-12 from its high potential condition as at time VI to its low potential condition as at time VII to place gate 262 in an enabled condition for permitting a new timing cycle. Once the logic gate 262 has its second input 262*b* at a high logic level, the high potential condition at input 2-12, as a time IV, FIG. 2, is effective to initiate a new timing cycle. As indicated at time II, however, a momentary high potential condition at input conductor 2-12 produces only a momentary low potential condition at 2B-1, so that when the input logic level returns to a low condition as at time III in FIG. 2, the timing circuit 263 is interrupted without emitting an output signal and is restored to its initial condition.

Referring to the monostable 270–274, for example, and applying the reference numerals 2A-1 and 2A-2 to pulse circuit 273, with the input signal low (at 2-13) the output of 270 will be held high and the input 2A-1 of circuit 273 will be held high, and the output 2A-2 of circuit 273 will normally be high; thus the output of 271 will be low. The input 2A-1 being high in FIG. 2A will cause the 2N5134 transitor TI to be saturated. This prevents the capacitor C from charging up; the output of 274 will be held low. When the gate signal goes high at 2-13, input 2A-1 will go low. The 2N5134 transistor TI will cut off and allow the capacitor C to charge through the resistor R2 from the plus 5 volt supply. When the voltage across the capacitor reaches approximately 3.5 volts, the 2N4871 unijunction transistor T2 will conduct and discharge the capacitor C. At this time, a negative going pulse will appear at 2A-2. This pulse will force the output of 271 to go high and in turn the output of 270 will go low. When this happens, 2A-1 will go high and saturate the 2N5134 transistor TI once again. As soon as the gate signal at 2-13 goes low once more, the circuit will be in its original state. Thus, when the input goes high, the output at 1-24, 1-25 and 2-7 will deliver a pulse whose delay will be determined by the RC time constant of the resistor R2 and the capacitor C. (For circuit 273, $R2$=3,300 ohms and $C$ =0.1 microfarad.) The only restriction on this is that the input must stay high long enough for the circuity to time out. Hereafter in this description, this circuit will be described merely as a one-shot. This circuit has certain advantages, one of them being that it is extremely noise-immune. This circuit has been tested with noise spikes of over 7 volts appearing on the ground line and it has not misfired. It also has the advantage in that it can deliver a delayed pulse which would require two normal one-shots to do this. In this way, it provides a cost savings of about 50 percent.

FIG. 1 shows the circuit details of FIG. 2A of U.S. Pat. No. 3,622,763 substituted in place of rectangle 263 of the second figure of said patent to facilitate an understanding of the operation of the monostable circuit 260–263.

When the signal $\overline{\text{TR DRIVE}}$ goes low, flip-flop 260–261 is actuated to supply a high logical potential level to the lower input of gate 262. When the potential at 2-12 goes high again, the potential at 2B-1 at the output of gate 262 goes low, cutting off transistor 263-T1 and allowing capacitor 263-C to charge through resistor 263-R2 from the plus 5 volt supply. When the voltage across capacitor 263-C reaches approximately 3.5 volts, unijunction transistor 263-T2 will conduct and discharge capacitor 263-C. At this time a negative going output signal will appear at 2B-2, forcing the output of gate 261 to go high and the output of gate 260 to go low. When this happens, the output of gate 262 at 2B-1 will go high, placing transistor 263-T1 in a saturated conducting condition and discharging capacitor 263-C. The circuit is now restored to its initial condition with unijunction 263-T2 turned off and output 2B-2 at the high potential level.

Thus the timing circuit 263 responds to a low logic level at 2B-1 to begin a timing cycle of a duration determined by the values of 263-R2 and 263-C. When the timing cycle is completed, the output at 2B-2 goes low and then high again when capacitor 263-C is discharged through transistor 263-T2, so as to supply a delayed pulse-type output waveform. (A conventional monostable delay circuit shifts to one logic level at the beginning of a timing cycle and returns to the initial logic level at the end of the timing cycle and thus does not supply a "pulse output signal at the end of the timing cycle" as this terminology is used herein.) Resistor 263-R1 conductively couples conductor 2B-1 with the base electrode of transistor 263-T1 and this arrangement constitutes a control input for the timing circuit for controlling the continuation of the timing cycle. The gate 262 constitutes a binary circuit element connected to control input at 2B-1 for supplying an input signal thereto.

I claim as my invention:

1. A monostable circuit comprising a. an input conductor for receiving a logical input signal shiftable between respective different logic levels, b. a timing circuit having a control input responsive to a first logic level of a logical control signal to execute a timing cycle of predetermined duration, beginning with the timing circuit in an initial condition, and for supplying an output signal at the end of the timing cycle, and said control input controlling the continuation of said timing cycle and being responsive to shifting of said logical control signal from the first logic level to a second logic level to interrupt the timing cycle without emitting said output signal and to restore said timing circuit to its initial condition, c. a logic gate having an output connected to the control input of said timing circuit for supplying said logical control signal thereto, and having a first logic gate input connected with said input conductor, and having a second logic gate input, and d. bistable means having a first input connected with said output of said timing circuit and having an output connected with said second logic gate input and said bistable means being responsive to said output signal from said timing circuit to control said logic gate to establish said second logic level of said logical control signal at said control input for restoring the timing circuit to its initial condition in response to said output signal, and having a second input connected with said input conductor for responding to a shifting of the logical input signal from one of the logic levels thereof to the other to establish an enabling potential level at said second logic gate input and thereby to place said logic gate in an enabled condition, e. said logic gate when in said enabled condition being continuously responsive to the potential level at the first logic gate input thereof to apply said first logic level to said control input of said timing circuit only so long as the potential level at said input conductor remains at the corresponding one of its logic levels, and being responsive to shifting of the potential level at said input conductor to the other of its logic levels at any time before completion of a timing cycle to apply the second logic level to said control input of said timing circuit to interrupt the timing cycle without emission of said output signal and to restore said timing circuit to its initial condition.

* * * * *